(12) United States Patent
Thor et al.

(10) Patent No.: US 11,698,971 B2
(45) Date of Patent: Jul. 11, 2023

(54) SECURE BOOT DEVICE

(71) Applicant: Honeywell International Inc., Morris Plains, NJ (US)

(72) Inventors: Ralf Thor, Baden-Wuerttemberg (DE); Nagaraja Sundaresh, Karnataka State (IN); Francois Vincent, Hessen (DE); Pradeep Durgam, Telangana (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 160 days.

(21) Appl. No.: 17/231,353

(22) Filed: Apr. 15, 2021

(65) Prior Publication Data

US 2022/0335132 A1 Oct. 20, 2022

(51) Int. Cl.
| | | |
|---|---|---|
| G06F 21/57 | (2013.01) | |
| G06F 8/654 | (2018.01) | |
| H04L 9/32 | (2006.01) | |

(52) U.S. Cl.
CPC ............ G06F 21/575 (2013.01); G06F 8/654 (2018.02); G06F 21/572 (2013.01); H04L 9/3242 (2013.01); H04L 9/3247 (2013.01); G06F 2221/033 (2013.01)

(58) Field of Classification Search
CPC ...... G06F 21/575; G06F 21/572; G06F 8/654; G06F 2221/033; H04L 9/3242; H04L 9/3247
See application file for complete search history.

(56) References Cited

U.S. PATENT DOCUMENTS

| | | | |
|---|---|---|---|
| 5,937,063 A | 8/1999 | Davis | |
| 8,914,627 B2 | 12/2014 | Park et al. | |
| 9,171,133 B2 | 10/2015 | Bettendorff | |
| 10,616,197 B2 | 4/2020 | Maletsky et al. | |
| 10,997,297 B1* | 5/2021 | Lin | .......................... H04L 9/30 |
| 2014/0223192 A1* | 8/2014 | Dent | ...................... G06F 21/52 713/189 |
| 2015/0261950 A1* | 9/2015 | Schulz | .................. H04L 9/0827 726/22 |
| 2017/0293484 A1* | 10/2017 | Haase | ................. H04L 63/0428 |
| 2018/0060589 A1* | 3/2018 | Polak | .................... H04L 63/123 |

FOREIGN PATENT DOCUMENTS

| | | |
|---|---|---|
| EP | 3259698 B1 | 12/2020 |
| WO | 2016131553 A1 | 8/2016 |

OTHER PUBLICATIONS

Suillen, et al., "Crypto-Bootloader-Secure in-field firmware updates for ultra-low power MCUs", Texas Instruments, Sep. 2005 (12 pages total).

Extended European Search Report dated Sep. 15, 2022, issued in connection with corresponding EP Application No. 22164906.4 (7 pages total).

* cited by examiner

*Primary Examiner* — Gary Collins
(74) *Attorney, Agent, or Firm* — John Maldjian; Stevens & Lee PC

(57) ABSTRACT

One embodiment is a device comprising a controller for verifying a digital signature of a process, a memory for storing an indication from the controller that the digital signature was verified the indication including at least one symmetric key, and a bootloader for receiving the indication from the memory and performing at least one security check using the at least one symmetric key, wherein the bootloader executes a function of the external process, only when it passes the security check.

20 Claims, 6 Drawing Sheets

SECURE BOOT DEVICE

CROSS-REFERENCE TO RELATED APPLICATIONS

None

BACKGROUND

Many computing devices serve a very specific function. Examples include IOT devices generally, and more specifically metering devices such as electric and gas meters. In the case of a metering device, its functionality is controlled by a computing device whose purpose is to enable the control of the physical meter so that electricity or gas can be harnessed in the appropriate manner. Such computing devices are typically deployed in masse, and as such, it is crucial to design these computers to carry out their function such that the device is as economical and compact as possible. This means that these devices have a small footprint and limited memory. Moreover, they must boot fast because they meter gas or electricity in real time and if they are down, metered revenue will be lost.

It is critical to update the software remotely on these types of computing devices. These updates make it difficult to design a computing device that boots fast, but is also secure, small, and economical. For example, a firmware update requires both the integrity and authenticity of the firmware to be checked. Typically, public key algorithms are employed to verify the digital signature of the firmware. This type of algorithm is disadvantageous because it requires a lot of memory and processing power.

SUMMARY OF THE INVENTION

One embodiment is a device comprising a controller for verifying a digital signature of a process, a memory for storing an indication from the controller that the digital signature was verified the indication including at least one symmetric key, and a bootloader for receiving the indication from the memory and performing at least one security check using the at least one symmetric key, wherein the bootloader executes a function of the process, only when it passes the security check.

Another embodiment is a system comprising a control module for verifying a digital signature of an external system, a memory module for storing an indication from the controller that the digital signature was verified the indication including at least one symmetric key, and a bootloading module for receiving the indication from the memory and performing at least one security check using the at least one symmetric key, wherein the bootloading module executes a function of the external system, only when it passes the security check.

In another embodiment, a method comprises receiving a firmware update with a controller, storing the firmware update in a storage memory by the controller, verifying a digital signature of the firmware update by the controller, storing an identifier in a secure location, if the controller verifies the firmware update, accessing the identifier with a bootloader, performing a security check by the bootloader using the identifier, and installing an update, only when the bootloader successfully performs the security check.

DETAILED DESCRIPTION OF THE INVENTION

Figure 1:
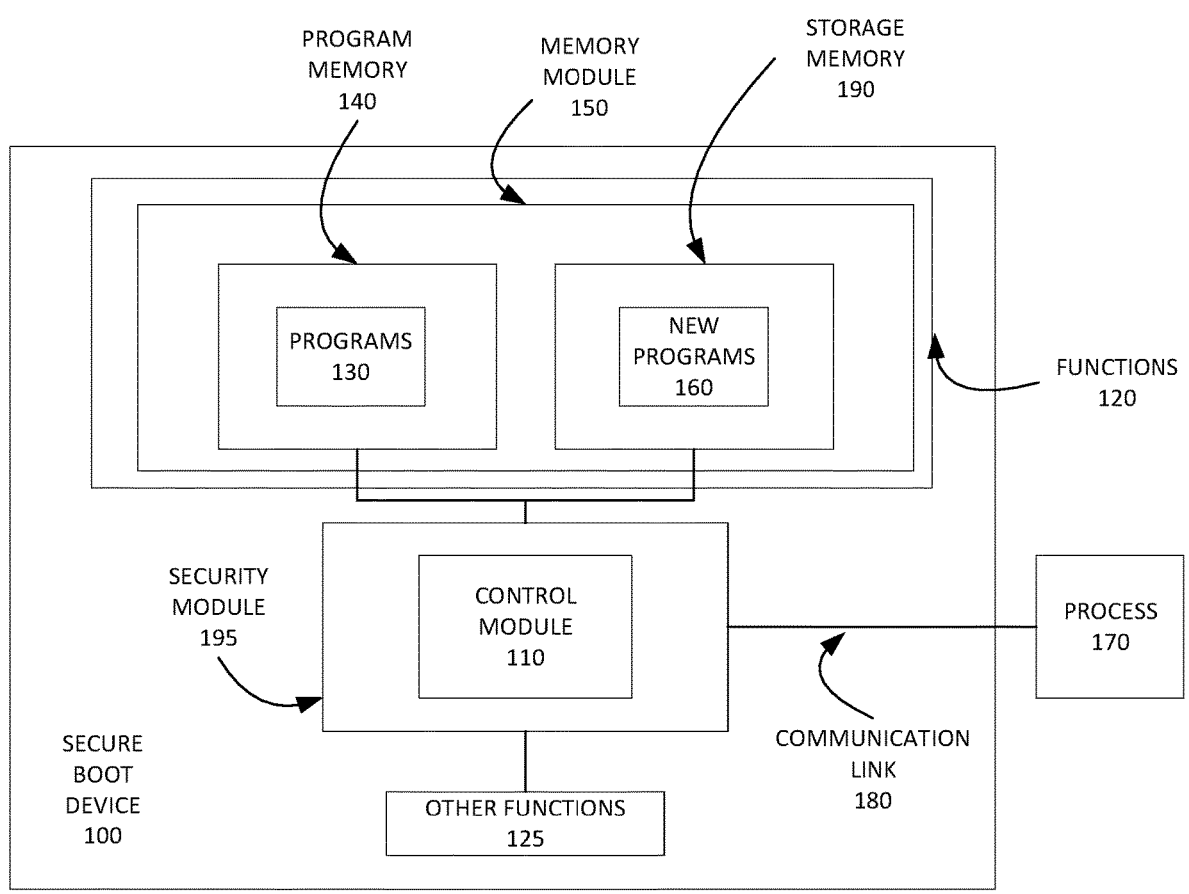
FIG. 1 is a diagram of a secure boot device according to one embodiment.

FIG. 1 illustrates a secure boot device 100 according to one embodiment. The secure boot device 100 can be an environment where various embodiments can be carried out. The secure boot device 100 can use a combination of digital signature and symmetric key message digest mechanisms to achieve high security for firmware verification while maintaining a low footprint and fast startup bootloader. The secure boot device 100 uses a control module 110, such as a microcontroller, which can perform a plurality of functions 120 with respect to the secure boot device 100. Some examples of functions 120 that a control module 110 can carry out include, but are not limited sensing functions, controlling functions, and metering functions. The control module 110 is also capable of carrying out any other general functions 125, such as those that would be commonly needed by IOT functionality. These general functions 125 can be used with various embodiments of the invention, however it is not required.

In one example, the control module 110 executes a program 130, such as a firmware program, from a program memory portion 140 of a memory 150. New programs 160, such as firmware updates, can be installed to the secure boot device 100. To this end, a process 170 communicates to the control module 110 through a communication link 180. The process 170, in one example, can be software, firmware, and/or hardware software running on a computing device (not shown) which is local, remote, and/or in a cloud. The communication link 180 can be any suitable scheme such as serial communications, Ethernet communications, or wireless communications.

When the process 170 communicates the new programs 160 to the control module 110, the control module 110 can enable a downloaded image of the new programs 160 to be stored in a storage memory portion 190 of the memory 150. A security module 195 can be used to ensure that the new programs 160 pass a security check before the new programs 160 are written to the program memory portion 140. If the new programs 160 do not pass the security check, they are not written to the program memory portion 140.

Figure 2:
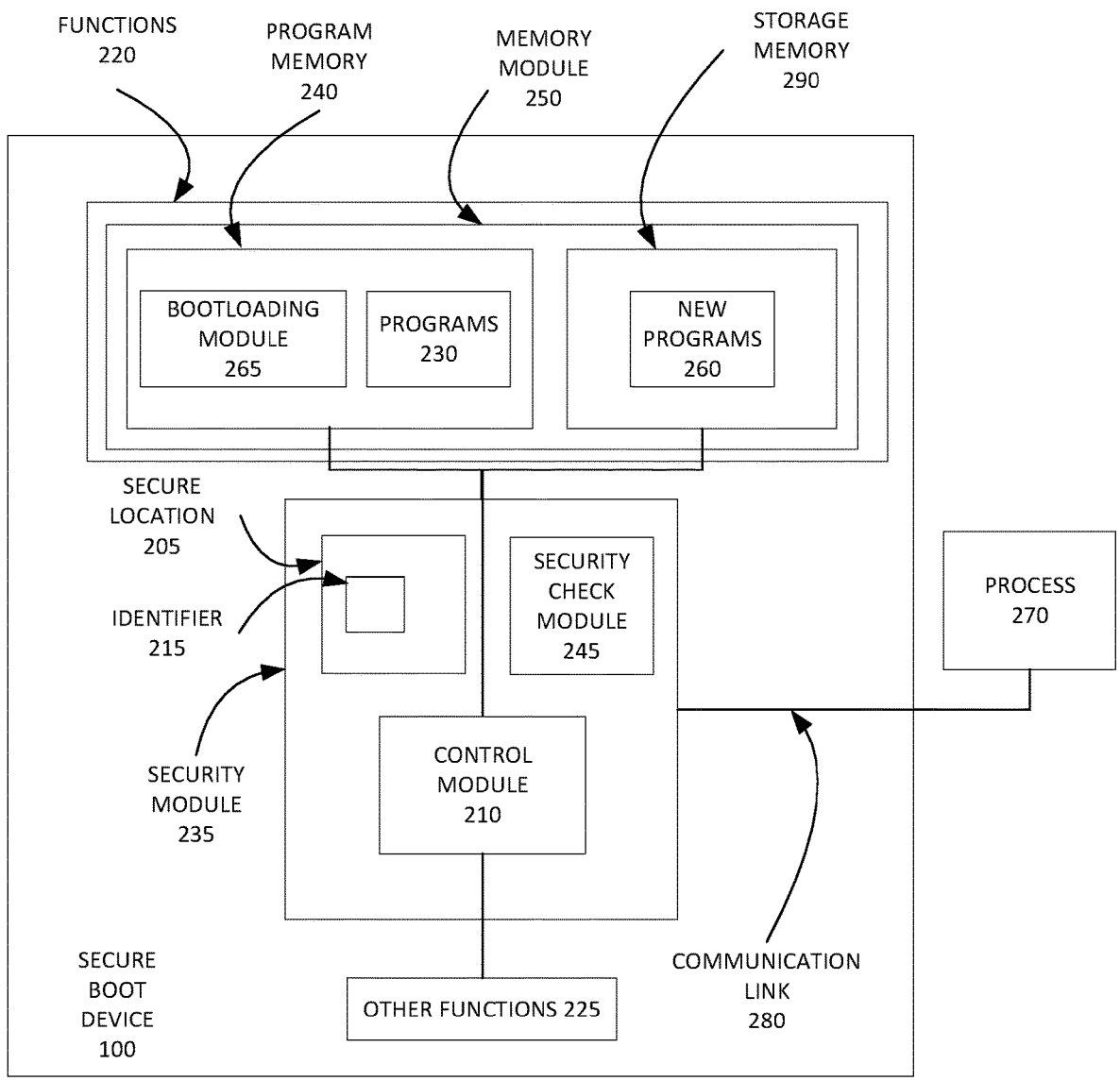
FIG. 2 is a diagram of the secure boot device according to another embodiment.

FIG. 2 illustrates the secure boot device 100 according to another embodiment. The secure boot device 100 uses a control module 210, such as a microcontroller, which can perform a plurality of functions 220 with respect to the secure boot device 100. Some examples of functions 220 that a control module 110 can carry out were described with respect to FIG. 1, including any other general functions 225, such as those that would be commonly needed by IOT functionality. These general functions 225 can be used with various embodiments of the invention, however it is not required.

In one example, the control module 210 executes a program 230, such as a firmware program, from a program memory portion 240 of a memory 250. New programs 260, such as firmware updates, can be installed to the secure boot device 100. To this end, a process 270 communicates to the control module 210 through a communication link 280. The process 170, in one example, can be software, firmware, and/or hardware software running on a computing device (not shown) which is local, remote, and/or in a cloud.

When the process 270 communicates the new programs 260 to the control module 210, the control module 210 can enable a downloaded image of the new programs 260 to be stored in a storage memory portion 290 of the memory 250. A security module 235 can be used to ensure that the new programs 160 pass a security check before the new programs 160 are written to the program memory portion 140. In one example, the security module 235 has a security check module 245, which enables the control module 210 and the process 270 to perform a digital signature verification. This could include, for example, cryptographic techniques, such as those that use public key algorithms.

If the verification is successful in the security check module 245, the process 270 can write an identifier 215 to a secure location 205. If the verification is not successful, the security check module 245 will not allow the new programs 260 to be installed. If the verification is successful, a bootloading module 265 accesses the secure location 205 upon re-boot of the secure boot device 100. Security check module 245 is used to perform a second security check with regard to the process 270. In the second security check, security check module 245 uses the identifier 215 in the secure location 205 to perform a verification. This could be, for example using a symmetric key algorithm. If this verification does not succeed, the new programs 260 cannot be written to the program memory portion 240. If the verification is successful, the new programs 260 can be installed into the program memory portion 240.

Figure 3:
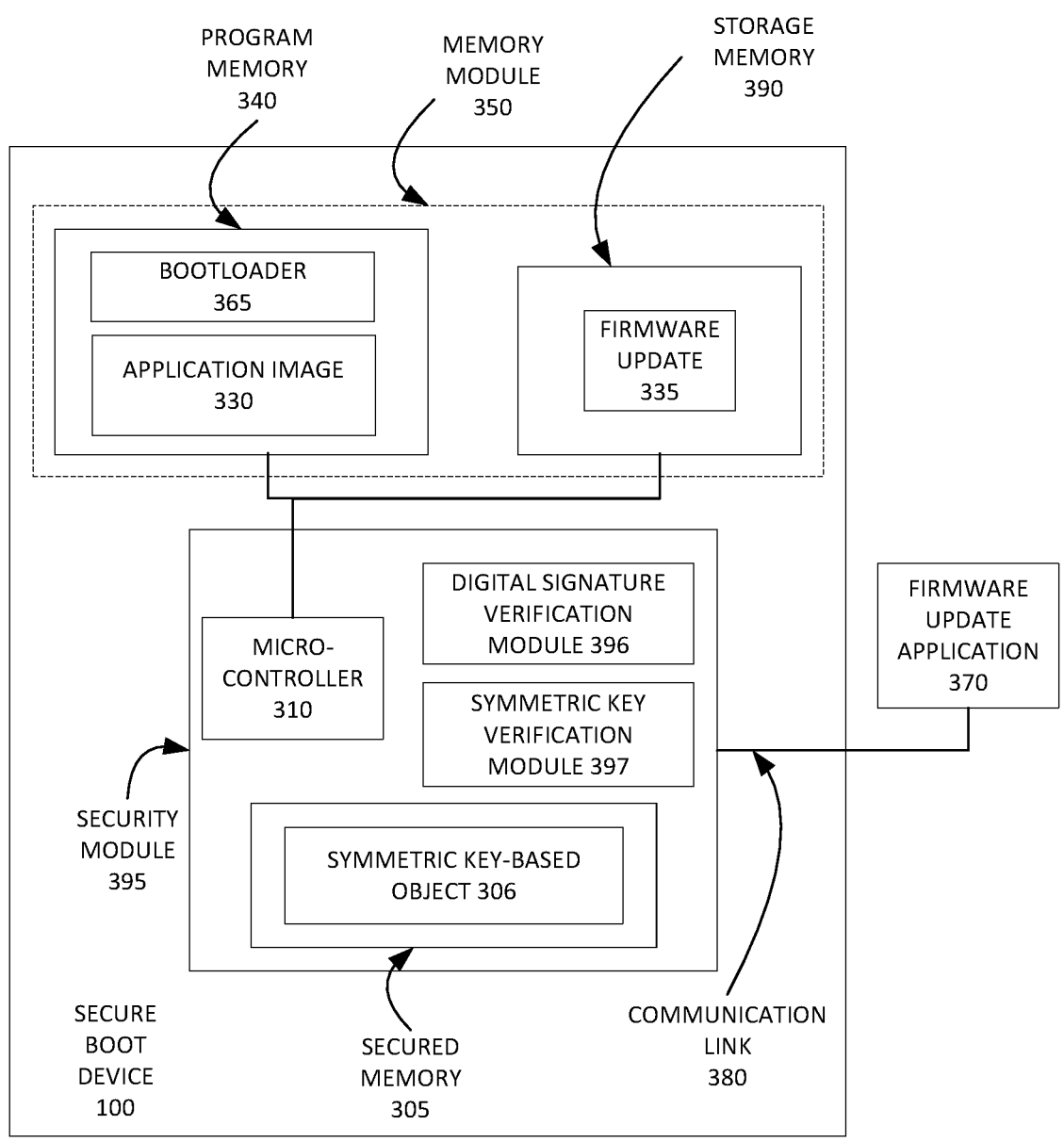
FIG. 3 is a diagram of the secure boot device according to another embodiment.

FIG. 3 illustrates the secure boot device 100 according to another embodiment. The secure boot device 100, can be a meter, such as an electric power meter or a gas meter. The secure boot device 100 uses a microcontroller 310. In one example, the microcontroller 310, executes an application image 330, from a program memory portion 340 of a memory 350. The program memory portion 340 of the memory 350, can be internal or external flash of the microcontroller 310, for instance. One purpose of the application image 330 is to run an application. Although only one application image 330 is shown here, it should be understood that various embodiments of the invention apply equally to any number of application images.

A firmware update 335, can be installed to the secure boot device 100. To this end, a firmware update application 370 communicates to the microcontroller 310 through a communication link 380. In response, the microcontroller 310 enables a downloaded image of the firmware update 335 to be stored in a storage memory portion 390 of the memory 250. A security module 395 can be used to ensure that the firmware update 335 passes both an authenticity and an integrity test before it is written to the program memory portion 340 of the memory 350. In one example, the security module 395 has a digital signature verification module 396. The digital signature verification module 396 is configured to perform a digital signature verification. This could include, for example, cryptographic techniques, such as those that use public key algorithms. If the verification fails, the firmware update application 370 is prevented from installing the firmware update 335.

If the verification is successful, the firmware update application 370 is permitted to pass a message authentication code (MAC) through a secured memory 305, or a hardware-security module (HSM), for example. In one embodiment, an AES HMAC, or other symmetric key-based object 306 is used. Thereafter, a bootloader 365 accesses the secured memory 305 upon re-boot of the secure boot device 100. In one embodiment, the bootloader 365 includes a firmware image which is responsible to upgrade the application image 330 in the program memory 340. The bootloader 365 can use the symmetric key-based object 306 with a symmetric key verification module 396. The symmetric key verification module 396 uses one of a plurality of potential symmetric-key algorithms. If this verification fails, the firmware update application 370 is prevented from installing the firmware update 335. If the verification is successful, the firmware update application 370 can install the firmware update 335 into the program memory portion 340.

Figure 4:
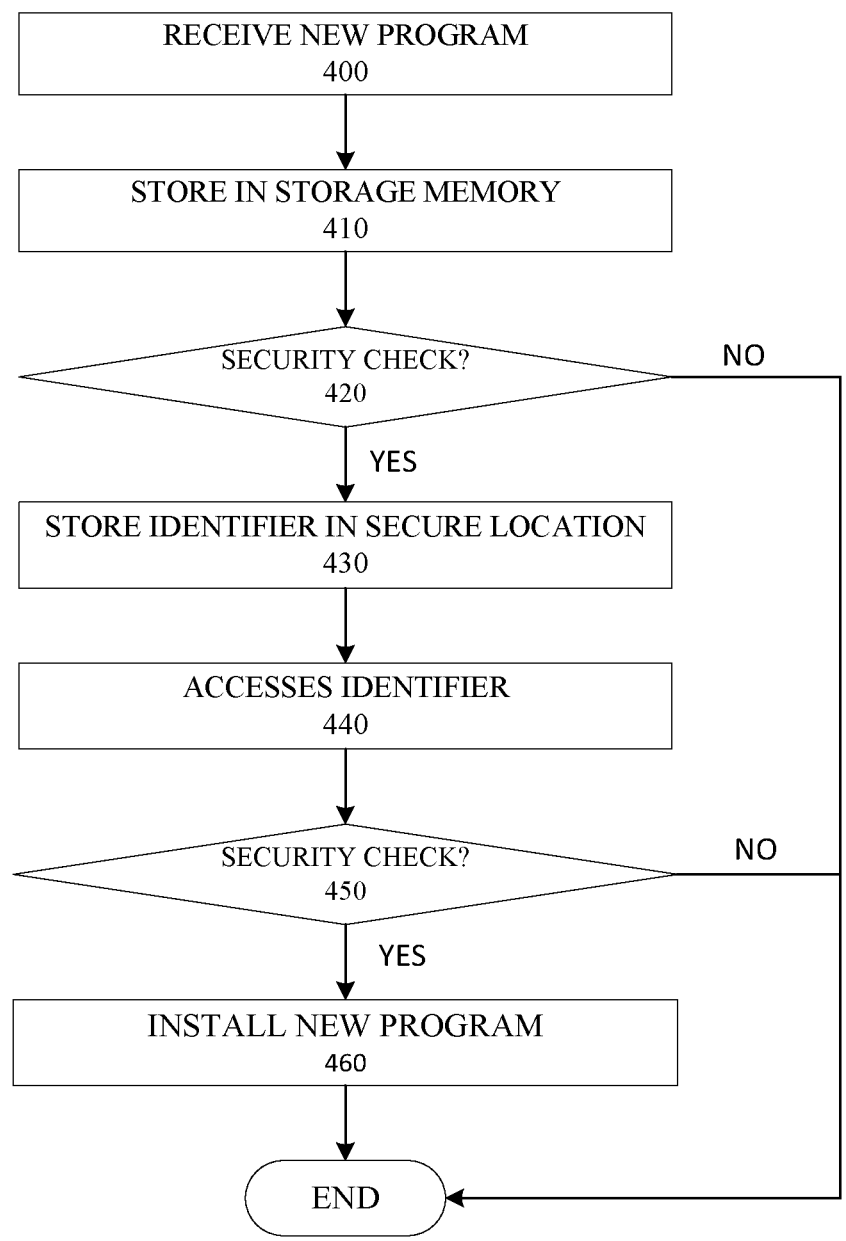
FIG. 4 is a flowchart that illustrates the operation of the secure boot device according to one embodiment.

FIG. 4 is a flowchart that illustrates the operation of the secure boot device according to one embodiment. At step 400, a new program is received. The program could be, for example, a firmware update. At step 410, the new program is stored in a storage memory. This could be, for example, any suitable type of memory that is separated from a program memory where authorized application images are permitted to run.

At step 420, the system determines whether the new program has passed a security check. The security check could be, for example, a verification using public-key cryptography. If the new program is not verified at step 420, it is prevented from being installed and the process ends. If the new program is verified, an identifier is stored in a secure location at step 430. The identifier could be, for example, a symmetric key-based object. At step 440, the identifier is accessed, for example by a bootloader, and a second security check takes place at step 450. In one example, step 450 uses the identifier. If the security check is passed, the new program is installed at step 460 and the process ends. Otherwise, the new program is prevented from being installed and the process ends.

Figure 5:
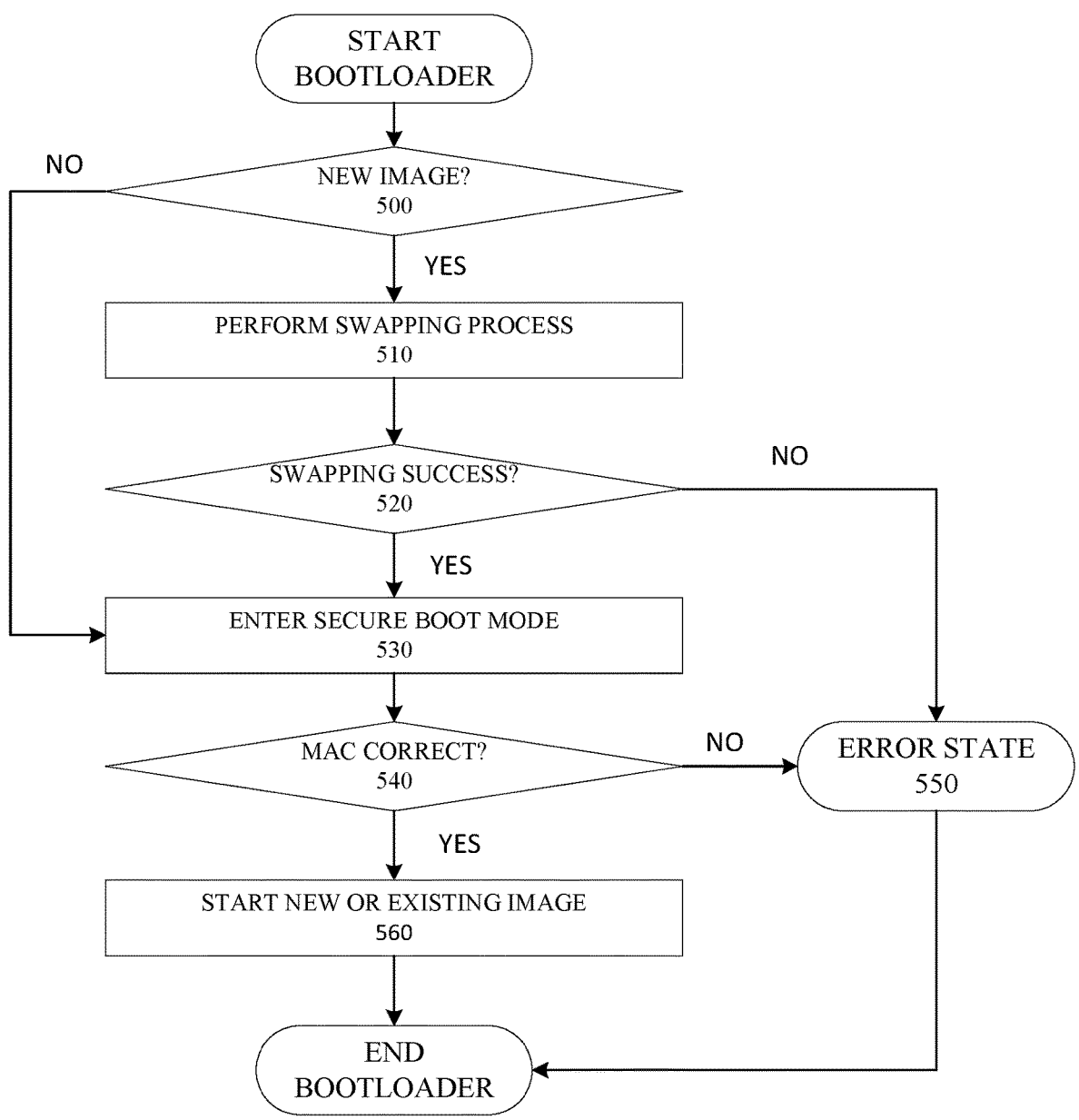
FIG. 5 is a flowchart that illustrates the operation of the secure boot device according to another embodiment.

FIG. 5 is a flowchart that illustrates the operation of the secure boot device according to another embodiment. In FIG. 5, the operation of a bootloader is shown in more detail. In the current example, the bootloader checks to see if there is a new image available at step 500. If there is no new image, then the bootloader will enter a secure boot mode at step 530, which will be described in further detail below. This could happen, for example, when there is no firmware update or other new image present and presenting itself to the bootloader for execution in the system. In this case, the secure boot mode can take place with the existing image.

If there is a new image, a swapping process occurs at step 510. The swapping process can include, for example, swapping the new image for an existing image. At step 520, the system determines whether the existing image was successfully swapped for the new image. If not, the system enters an error state at step 550 and the bootloader terminates. Otherwise, at step 540, the bootloader determines whether a MAC is correct. The MAC can be retrieved, for example, from a secured memory or an HSM. If the MAC cannot be verified, the system enters the error state at step 550 and the bootloader terminates. Otherwise, at step 560 the new or existing image is started. In the case of an existing image, the process described herein includes a secure boot mode in the case of a normal booting of the system, where there is no request to update the firmware and the currently installed image is used. This could occur, for example, on normal power up of the system.

Figure 6:
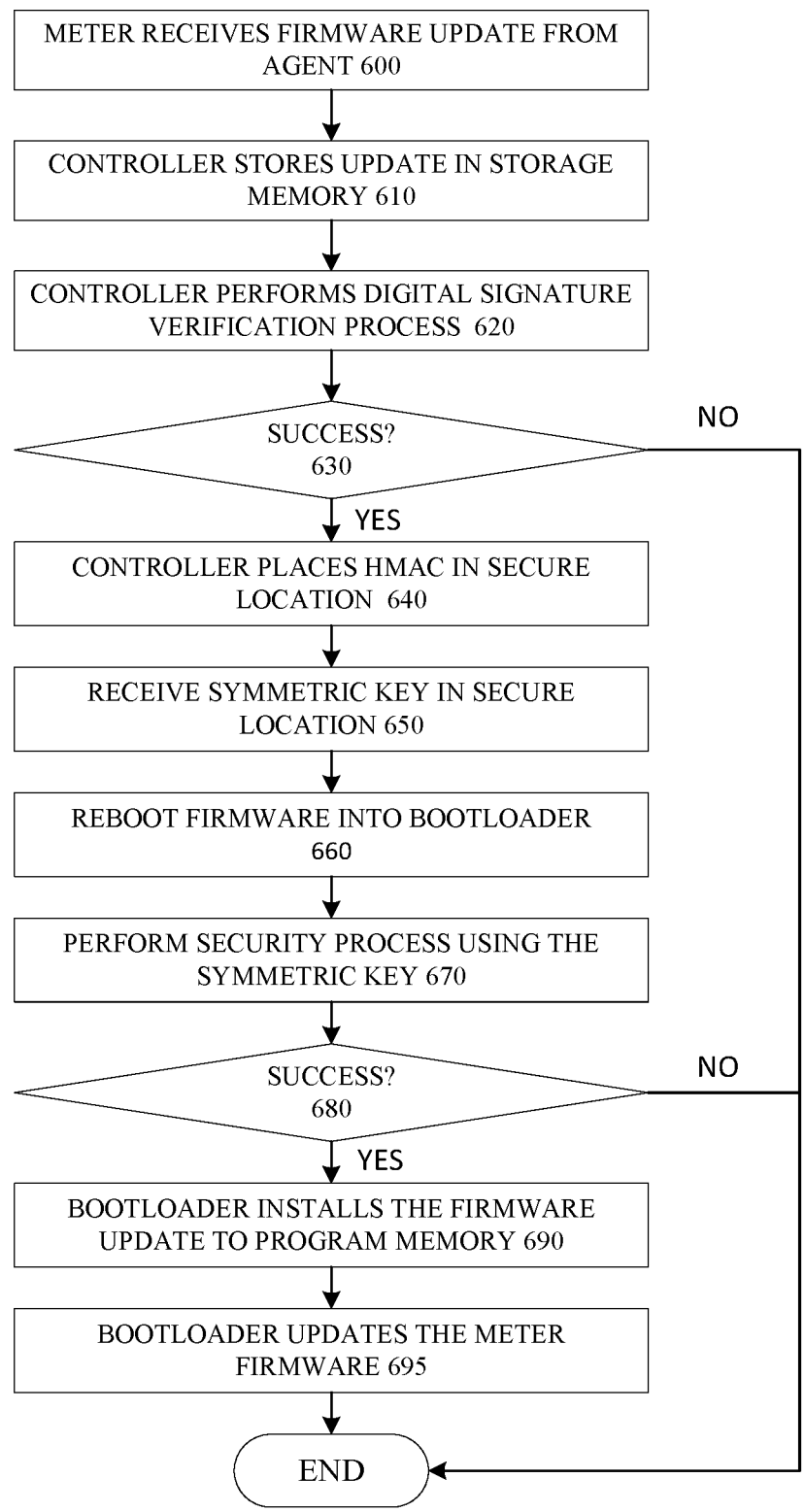
FIG. 6 is a flowchart that illustrates the operation of the secure boot device according to another embodiment.

FIG. 6 is a flowchart that illustrates the operation of the secure boot device according to another embodiment. At step 600, a meter receives a firmware update from an external agent. At step 610, a microcontroller stores the update in a storage memory. This could be, for example, any suitable type of memory that is separated from a program memory where authorized application images are permitted to run. At step 620, the microcontroller performs a digital signature verification process. This could utilize public-key cryptography, for example. At step 630, the system determines whether the firmware updates digital signature has been successfully verified. If the digital signature is not verified at step 630, the update is prevented from being installed and the process ends. If the verification is a success, the microcontroller places an HMAC and/or a symmetric key in a secure location, such as a secured memory or an HSM, at steps 640 and 650.

At step 660, the firmware is rebooted into a bootloader. At step 670, the bootloader performs a security process using the symmetric key. In one example, the bootloader determines whether the HMAC is correct as part of the security process. For example, the HMAC of the application image of the firmware update can be calculated and compared with the HMAC stored in the secure location. In one embodiment, an internally generated, unique key for each meter can be used. At step 680, the system determines whether the security check using symmetric key-based object and/or the HMAC has been successful. If not, the update is prevented from being installed and the process ends. If the verification is a success, the bootloader installs the firmware update into the program memory at step 690. Thereafter, at step 695 the bootloader updates the meter's firmware and the process ends.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A device comprising:
    a controller that verifies a digital signature of a process;
    a memory that stores an indication from the controller that the digital signature was verified the indication including at least one symmetric key; and
    a bootloader that receives the indication from the memory and performing at least one security check using the at least one symmetric key, wherein the bootloader exchanges a new image for an existing image and determines if a message authentication code (MAC) is correct,
    wherein the bootloader executes a function of an external process, only when it passes the security check.

2. The device of claim 1, wherein the process is a firmware application.

3. The device of claim 2, wherein the firmware application is configured to update at least one software, hardware, or firmware element of the device.

4. The device of claim 3, wherein the at least one software, hardware, or firmware element is stored in a program memory portion of the memory.

5. The device of claim 3, wherein the firmware application is stored in a storage memory portion of the memory.

6. The device of claim 1, wherein the indication includes the MAC.

7. The device of claim 1, wherein the memory includes a secure location, the indication being stored therein by the controller.

8. The device of claim 1, wherein the process is an existing image and wherein the existing image is configured to interact with at least one software, hardware, or firmware element of the device.

9. A system comprising:
    a control module that verifies a digital signature of a first system;
    a memory module that stores an indication from the controller that the digital signature was verified the indication including at least one symmetric key; and
    a bootloading module that receives the indication from the memory and performing at least one security check using the at least one symmetric key, wherein the bootloading module exchanges a new image for an existing image and determines if a message authentication code (MAC) is correct,
    wherein the bootloading module executes a function of an external system, only when it passes the security check.

10. The system of claim 9, wherein the first system includes a firmware application.

11. The system of claim 10, wherein the firmware application is configured to update at least one software, hardware, or firmware element of the system.

12. The system of claim 11, wherein the first system includes an existing image and wherein the existing image is configured to interact with at least one software, hardware, or firmware element of the system.

13. The system of claim 11, wherein the at least one software, hardware, or firmware element is stored in a program memory portion of the memory module.

14. The system of claim 11, wherein the firmware application is stored in a storage memory portion of the memory module.

15. The system of claim 9, wherein the indication includes the MAC.

16. The system of claim 9, wherein the memory module includes a secure location, the indication being stored therein by the control module.

17. A method comprising:
    receiving a firmware update with a controller;
    storing the firmware update in a storage memory by the controller;
    verifying a digital signature of the firmware update by the controller;
    storing an identifier in a secure location, if the controller verifies the firmware update;
    accessing the identifier with a bootloader;
    performing a security check by the bootloader using the identifier, wherein the bootloader exchanges a new image for an existing image and determines if a message authentication code (MAC) is correct; and
    installing an update, only when the bootloader successfully performs the security check.

18. The method of claim 17, wherein the step of performing a security check comprises using a symmetric key.

19. The method of claim 17, wherein the identifier includes the MAC.

20. The method of claim 17, wherein the step of installing includes writing the firmware update to a program memory.

* * * * *